United States Patent
Tran et al.

(10) Patent No.: US 6,421,464 B1
(45) Date of Patent: Jul. 16, 2002

(54) FAST LAPPED IMAGE TRANSFORMS USING LIFTING STEPS

(75) Inventors: Trac D. Tran, Columbia, MD (US); Pankaj Topiwala, Manassas, VA (US)

(73) Assignee: FastVDO LLC, Columbia, MD (US)

(*) Notice: Subject to any disclaimer, the term of this patent is extended or adjusted under 35 U.S.C. 154(b) by 0 days.

(21) Appl. No.: 09/212,210

(22) Filed: Dec. 16, 1998

(51) Int. Cl.$^7$ ................................................. G06K 9/36
(52) U.S. Cl. ................................................. 382/232
(58) Field of Search ......................... 382/232, 233, 382/236, 238, 239, 240, 242, 248, 250; 358/432, 433; 348/384, 394, 395, 400–404, 407–416, 420, 421, 425, 430, 431, 699; 341/51, 63, 65, 67, 107; 364/724.011, 724.04, 724.05, 724.13, 724.14, 725.01, 725.02; 708/400; 375/240.11, 240.16

(56) References Cited

U.S. PATENT DOCUMENTS

| | | | | |
|---|---|---|---|---|
| 5,081,645 A | * | 1/1992 | Resnikoff et al. | 375/1 |
| 5,339,265 A | * | 8/1994 | Liu et al. | 364/725 |
| 5,592,569 A | * | 1/1997 | Li | 382/253 |
| 5,604,824 A | * | 2/1997 | Chui et al. | 382/232 |
| 5,764,698 A | * | 6/1998 | Sudharsanan et al. | 375/241 |
| 5,805,739 A | * | 9/1998 | Malvar et al. | 382/253 |
| 5,812,219 A | * | 9/1998 | Heusdens | 348/699 |
| 5,857,036 A | * | 1/1999 | Barnsley et al. | 382/244 |
| 5,859,788 A | * | 1/1999 | Hou | 364/725.01 |
| 5,883,981 A | * | 3/1999 | Li et al. | 382/253 |
| 5,898,798 A | * | 4/1999 | Bouchard et al. | 382/232 |
| 5,901,251 A | * | 5/1999 | Rust | 382/247 |
| 5,903,669 A | * | 5/1999 | Hirabayashi | 382/232 |
| 5,946,038 A | * | 8/1999 | Kalker | 348/397 |
| 5,960,123 A | * | 9/1999 | Ito | 382/240 |
| 5,973,755 A | * | 10/1999 | Gabriel | 348/699 |
| 5,995,668 A | * | 11/1999 | Corset et al. | 382/233 |

(List continued on next page.)

OTHER PUBLICATIONS

Liang et al., "ITO–Telecommunications Standardization Sector", A 16–bit architecture fo H.26L treating DCT Transforms and quantization, pp. 1–12, May 29, 2001.*

Sweldens, Wim, "The Lifting Scheme: A custom design construction of biorthogonal wavelets", pp. 1–29, Nov. 1994.*

Nayebi et al., "A time domain view of filter banks and wavelets", Signals, Systems and Computers, 1991. 1991 Conference Record of the Twenty–Fifth Asilomar Conference on, 1991, pp. 736–740 vol. 2.*

*Primary Examiner*—Jose L. Couso
(74) *Attorney, Agent, or Firm*—Frederick C. Williams; Yan Lan; Williams & Associates (57) ABSTRACT

This invention introduces a class of multi-band linear phase lapped biorthogonal transforms with fast, VLSI-friendly implementations via lifting steps called the LiftLT. The transform is based on a lattice structure which robustly enforces both linear phase and perfect reconstruction properties. The lattice coefficients are parameterized as a series of lifting steps, providing fast, efficient in-place computation of the transform coefficients as well as the ability to map integers to integers. Our main motivation of the new transform is its application in image and video coding. Comparing to the popular 8×8 DCT, the 8×16 LiftLT only requires 1 more multiplication, 22 more additions, and 6 more shifting operations. However, image coding examples show that the LiftLT is far superior to the DCT in both objective and subjective coding performance. Thanks to properly designed overlapping basis functions, the LiftLT can completely eliminate annoying blocking artifacts. In fact, the novel LiftLT's coding performance consistently surpasses that of the much more complex 9/7-tap biorthogonal wavelet with floating-point coefficients. More importantly, our transform's block-based nature facilitates one-pass sequential block coding, region-of-interest coding/decoding as well as parallel processing.

11 Claims, 5 Drawing Sheets

U.S. PATENT DOCUMENTS

| | | | |
|---|---|---|---|
| 5,999,656 A | * 12/1999 | Zandi et al. | 382/248 |
| 6,018,753 A | * 1/2000 | Kovacevic et al. | 708/313 |
| 6,144,771 A | * 1/2000 | Li et al. | 382/239 |
| 6,094,631 A | * 7/2000 | Li et al. | 382/238 |
| 6,104,982 A | * 8/2000 | Vermeer | 702/14 |
| 6,144,773 A | * 11/2000 | Kolarov et al. | 382/240 |
| 6,198,412 B1 | * 3/2001 | Goyal | 341/50 |

* cited by examiner

FAST LAPPED IMAGE TRANSFORMS USING LIFTING STEPS

FIELD OF THE INVENTION

The current invention relates to the processing of images such as photographs, drawings, and other two dimensional displays. It further relates to the processing of such images which are captured in digital format or after they have been converted to or expressed in digital format. This invention further relates to use of novel coding methods to increase the speed and compression ratio for digital image storage and transmission while avoiding introduction of undesirable artifacts into the reconstructed images.

BACKGROUND OF THE INVENTION

In general, image processing is the analysis and manipulation of two-dimensional representations, which can comprise photographs, drawings, paintings, blueprints, x-rays of medical patients, or indeed abstract art or artistic patterns. These images are all two-dimensional arrays of information. Until fairly recently, images have comprised almost exclusively analog displays of analog information, for example, conventional photographs and motion pictures. Even the signals encoding television pictures, notwithstanding that the vertical scan comprises a finite number of lines, are fundamentally analog in nature.

Beginning in the early 1960's, images began to be captured or converted and stored as two-dimensional digital data, and digital image processing followed. At first, images were recorded or transmitted in analog form and then converted to digital representation for manipulation on a computer. Currently digital capture and transmission are on their way to dominance, in part because of the advent of charge coupled device (CCD) image recording arrays and in part because of the availability of inexpensive high speed computers to store and manipulate images.

An important task of image processing is the correction or enhancement of a particular image. For example, digital enhancement of images of celestial objects taken by space probes has provided substantial scientific information. However, the current invention relates primarily to compression for transmission or storage of digital images and not to enhancement.

One of the problems with digital images is that a complete single image frame can require up to several megabytes of storage space or transmission bandwidth. That is, one of today's 3½ inch floppy discs can hold at best a little more than one gray-scale frame and sometimes substantially less than one whole frame. A full-page color picture, for example, uncompressed, can occupy 30 megabytes of storage space. Storing or transmitting the vast amounts of data which would be required for real-time uncompressed high resolution digital video is technologically daunting and virtually impossible for many important communication channels, such as the telephone line. The transmission of digital images from space probes can take many hours or even days if insufficiently compressed images are involved. Accordingly, there has been a decades long effort to develop methods of extracting from images the information essential to an aesthetically pleasing or scientifically useful picture without degrading the image quality too much and especially without introducing unsightly or confusing artifacts into the image.

The basic approach has usually involved some form of coding of picture intensities coupled with quantization. One approach is block coding; another approach, mathematically equivalent with proper phasing, is multiphase filter banks. Frequency based multi-band transforms have long found application in image coding. For instance, the JPEG image compression standard, W. B. Pennebaker and J. L. Mitchell, "JPEG: Still Image Compression Standard," Van Nostrand Reinhold, 1993, employs the 8×8 discrete cosine transform (DCT) at its transformation stage. At high bit rates, JPEG offers almost lossless reconstructed image quality. However, when more compression is needed, annoying blocking artifacts appear since the DCT bases are short and do not overlap, creating discontinuities at block boundaries.

The wavelet transform, on the other hand, with long, varying-length, and overlapping bases, has elegantly solved the blocking problem. However, the transform's computational complexity can be significantly higher than that of the DCT. This complexity gap is partly in terms of the number of arithmetical operations involved, but more importantly, in terms of the memory buffer space required. In particular, some implementations of the wavelet transform require many more operations per output coefficient as well as a large buffer.

An interesting alternative to wavelets is the lapped transform, e.g., H. S. Malvar, Signal Processing with Lapped Transforms, Artech House, 1992, where pixels from adjacent blocks are utilized in the calculation of transform coefficients for the working block. The lapped transforms outperform the DCT on two counts: (i) from the analysis viewpoint, they take into account inter-block correlation and hence provide better energy compaction; (ii) from the synthesis viewpoint, their overlapping basis functions decay asymptotically to zero at the ends, reducing blocking discontinuities dramatically.

Nevertheless, lapped transforms have not yet been able to supplant the unadorned DCT in international standard coding routines. The principal reason is that the modest improvement in coding performance available up to now has not been sufficient to justify the significant increase in computational complexity. In the prior art, therefore, lapped transforms remained too computationally complex for the benefits they provided. In particular, the previous lapped transformed somewhat reduced but did not eliminate the annoying blocking artifacts.

It is therefore an object of the current invention to provide a new transform which is simple and fast enough to replace the bare DCT in international standards, in particular in JPEG and MPEG-like coding standards. It is another object of this invention to provide an image transform which has overlapping basis functions so as to avoid blocking artifacts. It is a further object of this invention to provide a lapped transform which is approximately as fast as, but more efficient for compression than, the bare DCT. It is yet another object of this invention to provide dramatically improved speed and efficiency using a lapped transform with lifting steps in a butterfly structure with dyadic-rational coefficients. It is yet a further object of this invention to provide a transform structure such that for a negligible complexity surplus over the bare DCT a dramatic coding performance gain can be obtained both from a subjective and objective point of view while blocking artifacts are completely eliminated.

SUMMARY OF THE INVENTION

In the current invention, we use a family of lapped biorthogonal transforms implementing a small number of dyadic-rational lifting steps. The resulting transform, called the LiftLT, not only has high computation speed but is well-suited to implementation via VLSI.

Moreover, it also consistently outperforms state-of-the-art wavelet based coding systems in coding performance when the same quantizer and entropy coder are used. The LiftLT is a lapped biorthogonal transform using lifting steps in a modular lattice structure, the result of which is a fast, efficient, and robust encoding system. With only 1 more multiplication (which can also be implemented with shift-and-add operations), 22 more additions, and 4 more delay elements compared to the bare DCT, the LiftLT offers a fast, low-cost approach capable of straightforward VLSI implementation while providing reconstructed images which are high in quality, both objectively and subjectively. Despite its simplicity, the LiftLT provides a significant improvement in reconstructed image quality over the traditional DCT in that blocking is completely eliminated while at medium and high compression ratios ringing artifacts are reasonably contained. The performance of the LiftLT surpasses even that of the well-known 9/7-tap biorthogonal wavelet transform with irrational coefficients. The LiftLT's block-based structure also provides several other advantages: supporting parallel processing mode, facilitating region-of-interest coding and decoding, and processing large images under severe memory constraints.

Most generally, the current invention is an apparatus for block coding of windows of digitally represented images comprising a chain of lattices of lapped transforms with dyadic rational lifting steps. More particularly, this invention is a system of electronic devices which codes, stores or transmits, and decodes M×M sized blocks of digitally represented images, where M is an even number. The main block transform structure comprises a transform having M channels numbered 0 through M−1, half of said channel numbers being odd and half being even; a normalizer with a dyadic rational normalization factor in each of said M channels; two lifting steps with a first set of identical dyadic rational coefficients connecting each pair of adjacent numbered channels in a butterfly configuration, M/2 delay lines in the odd numbered channels; two inverse lifting steps with the first set of dyadic rational coefficients connecting each pair of adjacent numbered channels in a butterfly configuration; and two lifting steps with a second set of identical dyadic rational coefficients connecting each pair of adjacent odd numbered channels; means for transmission or storage of the transform output coefficients; and an inverse transform comprising M channels numbered 0 through M−1, half of said channel numbers being odd and half being even; two inverse lifting steps with dyadic rational coefficients connecting each pair of adjacent odd numbered channels; two lifting steps with dyadic rational coefficients connecting each pair of adjacent numbered channels in a butterfly configuration; M/2 delay lines in the even numbered channels; two inverse lifting steps with dyadic rational coefficients connecting each pair of adjacent numbered channels in a butterfly configuration; a denormalizer with a dyadic rational inverse normalization factor in each of said M channels; and a base inverse transform having M channels numbered 0 through M−1.

DESCRIPTION OF THE PREFERRED EMBODIMENT

Figure 2:
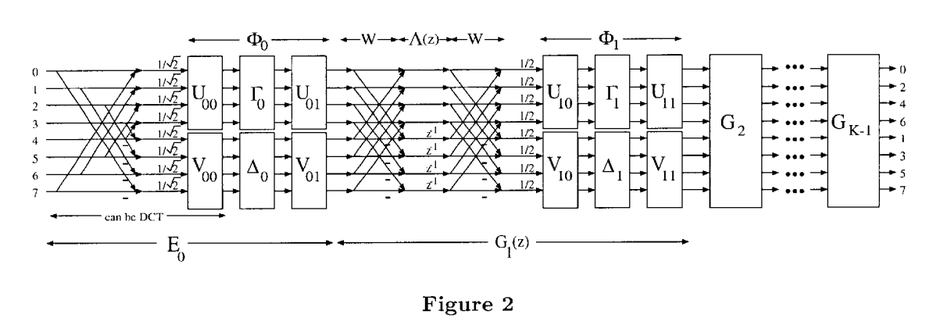
FIG. 2 shows the most general lattice structure for linear phase lapped transforms with filter length L=KM.

Typically, a block transform for image processing is applied to a block (or window) of, for example, 8×8 group of pixels and the process is iterated over the entire image. A biorthogonal transform in a block coder uses as a decomposition basis a complete set of basis vectors, similar to an orthogonal basis. However, the basis vectors are more general in that they may not be orthogonal to all other basis vectors. The restriction is that there is a "dual" basis to the original biorthogonal basis such that every vector in the original basis has a "dual" vector in the dual basis to which it is orthogonal. The basic idea of combining the concepts of biorthogonality and lapped transforms has already appeared in the prior art. The most general lattice for M-channel linear phase lapped biorthogonal transforms is presented in T. D. Tran, R. de Queiroz, and T. Q. Nguyen, "The generalized lapped biorthogonal transform," ICASSP, pp. 1441–1444, Seattle, May 1998, and in T. D. Tran, R. L. de Queiroz, and T. Q. Nguyen, "Linear phase perfect reconstruction filter bank: lattice structure, design, and application in image coding" (submitted to EEE Trans. on Signal Processing, April 1998). A signal processing flow diagram of this well-known generalized filter bank is shown in FIG. 2.

Figure 1:
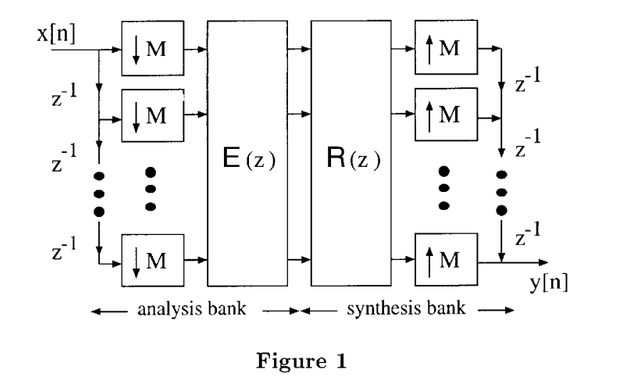
FIG. 1 is a polyphase representation of a linear phase perfect reconstruction filter bank.

In the current invention, which we call the Fast LiftLT, we apply lapped transforms based on using fast lifting steps in an M-channel uniform linear-phase perfect reconstruction filter bank, according to the generic polyphase representation of FIG. 1. In the lapped biorthogonal approach, the polyphase matrix E(z) can be factorized as $$E(z) = G_{K-1}(z) G_{K-2}(z) \ldots G(z) E_0(z), \quad (1)$$

where $$G_i(z) = \frac{1}{2} \begin{bmatrix} U_i & 0 \\ 0 & V_i \end{bmatrix} \begin{bmatrix} I & I \\ I & -I \end{bmatrix} \begin{bmatrix} I & 0 \\ 0 & z^{-1}I \end{bmatrix} \begin{bmatrix} I & I \\ I & -I \end{bmatrix} \quad (2)$$

$$\equiv \frac{1}{2} \Phi_i \times W \times \Lambda \times W, \text{ and}$$

$$E_0(z) = \frac{1}{\sqrt{2}} \begin{bmatrix} U_0 & U_0 J_{M/2} \\ V_0 J_{M/2} & -V_0 \end{bmatrix}. \quad (3)$$

In these equations, I is the identity matrix, and J is the matrix with 1's on the anti-diagonal.

The transform decomposition expressed by equations (1) through (3) is readily represented, as shown in FIG. 2, as a complete lattice replacing the "analysis" filter bank E(z) of FIG. 1. This decomposition results in a lattice of filters having length L=KM. (K is often called the overlapping factor.) Each cascading structure $G_1(z)$ increases the filter length by M. All $U_i$ and $V_i$, i=0,1, ..., K−1, are arbitrary M/2×M/2 invertible matrices. According to a theorem well known in the art, invertible matrices can be completely represented by their singular value decomposition (SVD), given by $$U_i = U_{i0} \Gamma_i U_{i1}, \quad V_i = V_{i0} \Delta_i V_{i1}$$

where $U_{i0}$, $U_{i1}$, $V_{i0}$, $V_{i1}$ are diagonalizing orthogonal matrices and $\Gamma_i$, $\Delta_i$ are diagonal matrices with positive elements.

Figure 3:
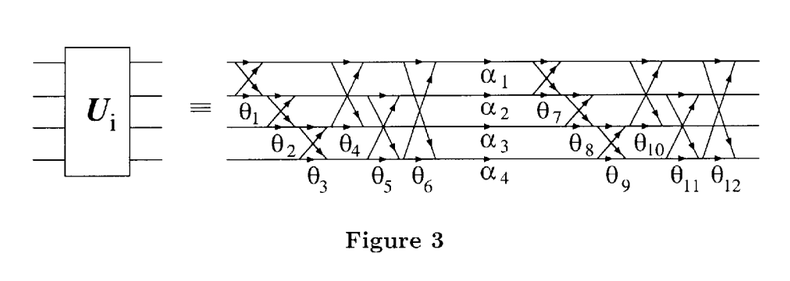
FIG. 3 shows the parameterization of an invertible matrix via the singular value decomposition.

It is well known that any M/2×M/2 orthogonal matrix can be factorized into M(M−2)/8 plane rotations $\theta_i$ and that the diagonal matrices represent simply scaling factors $\alpha_i$. Accordingly, the most general LT lattice consists of KM(M−2)/2 two dimensional rotations and 2M diagonal scaling factors $\alpha_i$. Any invertible matrix can be expressed as a sequence of pairwise plane rotations $\theta$ and scaling factors $\alpha_i$ as shown in FIG. 3.

It is also well known that a plane rotation can be performed by 3 "shears":

$$\begin{bmatrix} \cos\theta_i & -\sin\theta_i \\ \sin\theta_i & \cos\theta_i \end{bmatrix} = \begin{bmatrix} 1 & \frac{\cos\theta_i - 1}{\sin\theta_i} \\ 0 & 1 \end{bmatrix} \begin{bmatrix} 1 & 0 \\ \sin\theta_i & 1 \end{bmatrix} \begin{bmatrix} 1 & \frac{\cos\theta_i - 1}{\sin\theta_i} \\ 0 & 1 \end{bmatrix}.$$

This can be easily verified by computation

Each of the factors above is capable of a "lifting" step in signal processing terminology. The product of two which effects a linear transform of pairs of coefficients:

$$\begin{bmatrix} a \\ b \end{bmatrix} \rightarrow \begin{bmatrix} 1+km & k \\ m & 1 \end{bmatrix} \times \begin{bmatrix} a \\ b \end{bmatrix}.$$

Figure 4:
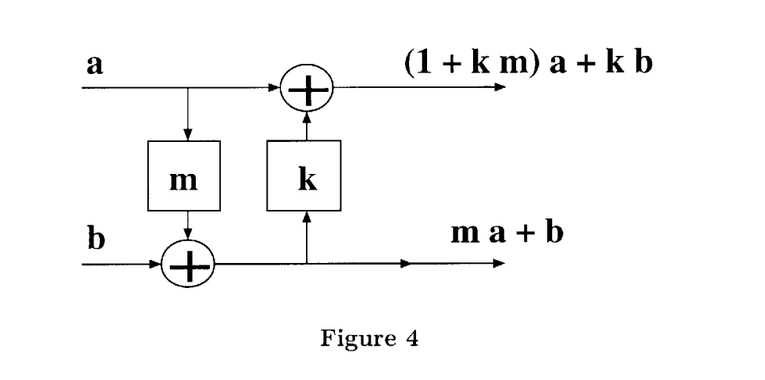
FIG. 4 portrays the basic butterfly lifting configuration.

The signal processing flow diagram of this operation is shown in FIG. 4. The crossing arrangement of these flow paths is also referred to as a butterfly configuration. Each of the above "shears" can be written as a lifting step.

Combining the foregoing, the shears referred to can be expressed as computationally equivalent "lifting steps" in signal processing. In other words, we can replace each "rotation" by 3 closely-related lifting steps with butterfly structure. It is possible therefore to implement the complete LT lattice shown in FIG. 2 by 3KM(−2)/2 lifting steps and 2M scaling multipliers.

In the simplest but currently preferred embodiment, to minimize the complexity of the transform we choose a small overlapping factor K=2 and set the initial stage $E_0$ to be the DCT itself Many other coding transforms can serve for the base stage instead of the DCT, and it should be recognized that many other embodiments are possible and can be implemented by one skilled in the art of signal processing.

Following the observation in H. S. Malvar, "Lapped biorthogonal transforms for transform coding with reduced blocking and ringing artifacts," ICASSP97, Munich, April 1997, we apply a scaling factor to the first DCT's antisymmetric basis to generate synthesis LT basis functions whose end values decay smoothly to exact zero—a crucial advantage in blocking artifacts elimination. However, instead of scaling the analysis by $\sqrt{2}$ and the synthesis by $1/\sqrt{2}$, we opt for 25/16 and its inverse 16/25 since they allow the implementation of both analysis and synthesis banks in integer arithmetic. Another value that works almost as well as 25/16 is 5/4. To summarize, the following choices are made in the first stage: the combination of $U_{00}$ and $V_{00}$ with the previous butterfly form the DCT;

$$\Delta_0 = diag\left[\frac{25}{16}, 1, \ldots, 1\right],$$

and $\Gamma_0 = U_{00} = V_{00} = I_{M/2}$. See FIG. 2.

After 2 series of ±1 butterflies W and the delay chain $\Lambda(z)$, the LT symmetric basis functions already have good attenuation, especially at DC ($\omega$=0). Hence, we can comfortably set $U_1 = I_{M/2}$.

As noted, $V_1$ is factorizable into a series of lifting steps and diagonal scalings. However, there are several problems: (i) the large number of lifting steps is costly in both speed and physical real-estate in VLSI implementation; (ii) the lifting steps are related; (iii) and it is not immediately obvious what choices of rotation angles will result in dyadic rational lifting multipliers. In the current invention, we approximate $V_1$ by (M/2)−1 combinations of block-diagonal predict-and-update lifting steps, i.e., $$\begin{bmatrix} 1 & u_i \\ 0 & 1 \end{bmatrix} \times \begin{bmatrix} 1 & 0 \\ -p_i & 1 \end{bmatrix}.$$

Here, the free parameters $u_i$ and $p_i$ can be chosen arbitrarily and independently without affecting perfect reconstruction. The inverses are trivially obtained by switching the order and the sign of the lifting steps. Unlike popular lifting implementations of various wavelets, all of our lifting steps are of zero-order, namely operating in the same time epoch. In other words, we simply use a series of 2×2 upper or lower diagonal matrices to parameterize the invertible matrix $V_1$.

Most importantly, fast-computable VLSI-friendly transforms are readily available when $u_i$ and $p_i$ are restricted to dyadic rational values, that is, rational fractions having (preferably small) powers of 2 denominators. With such coefficients, transform operations can for the most part be reduced to a small number of shifts and adds. In particular, setting all of the approximating lifting step coefficients to −1/2 yields a very fast and elegant lapped transform. With this choice, each lifting step can be implemented using only one simple bit shift and one addition.

Figure 5:
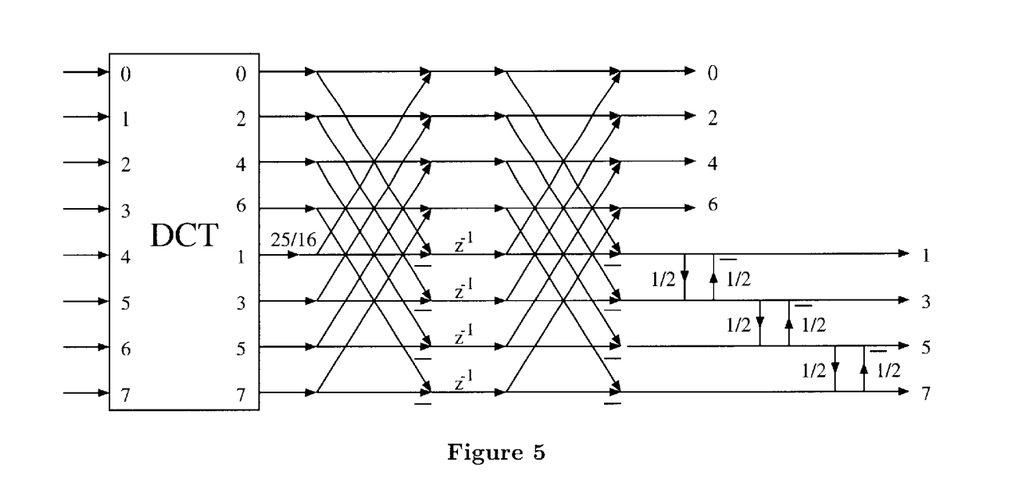
FIG. 5 depicts the analysis LiftLT lattice drawn for M=8.
Figure 6:
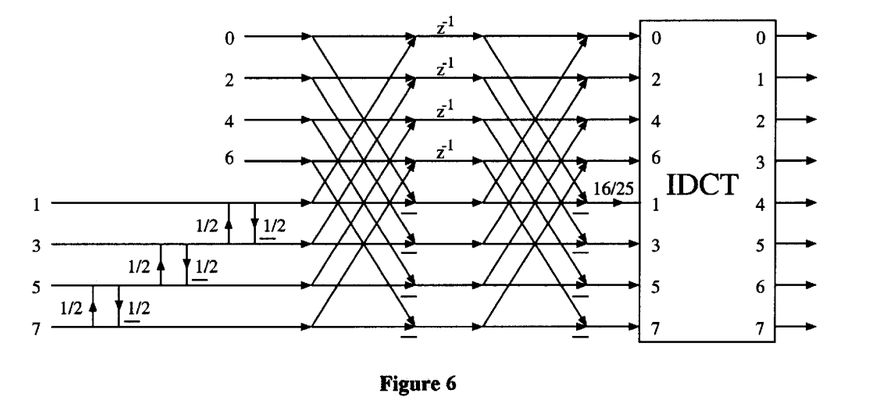
FIG. 6 depicts the synthesis LiftLT lattice drawn for M=8.
Figure 8:
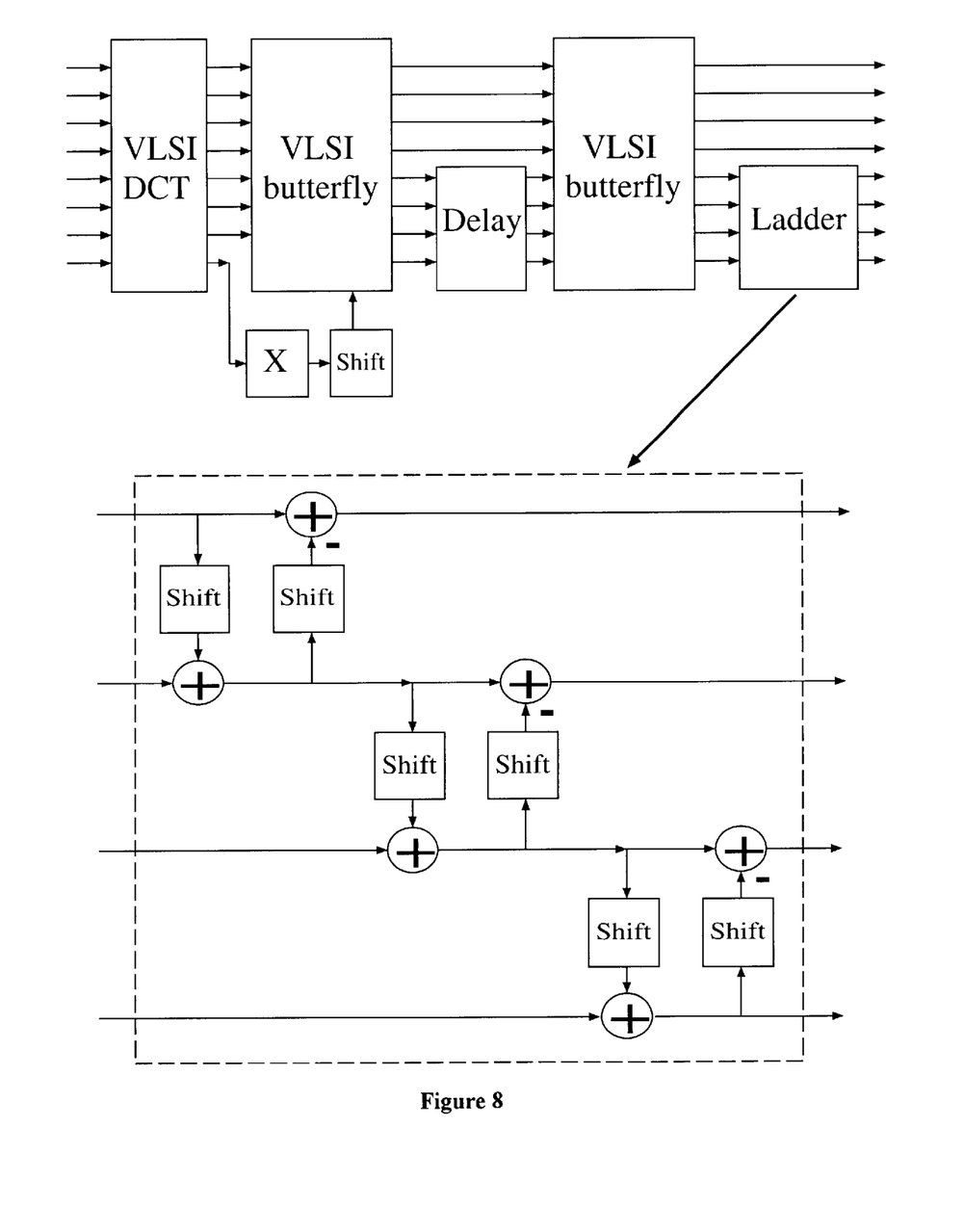
FIG. 8 shows frequency and time responses of the 8×16 LiftLT: Left: analysis bank. Right: synthesis bank.

The resulting LiftLT lattice structures are presented in FIGS. 5 and 6. The analysis filter shown in FIG. 5 comprises a DCT block 1, 25/16 normalization 2, a delay line 3 on four of the eight channels, a butterfly structured set of lifting steps 5, and a set of four fast dyadic lifting steps 6. The frequency and impulse responses of the 8×16 LiftLT's basis functions are depicted in FIG. 8.

Figure 7:
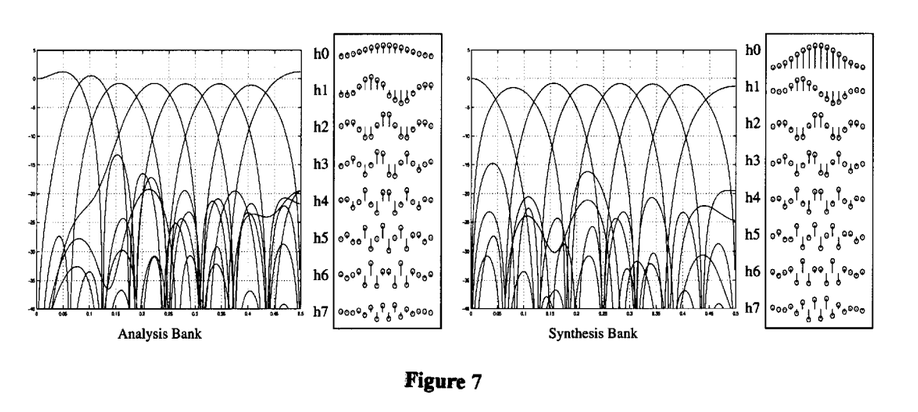
FIG. 7 depicts a VLSI implementation of the analysis filter bank operations.

The inverse or synthesis lattice is shown in FIG. 6. This system comprises a set of four fast dyadic lifting steps 11, a butterfly-structured set of lifting steps 12, a delay line 13 on four of the eight channels, 16/25 inverse normalization 14, and an inverse DCT block 15. FIG. 7 also shows the frequency and impulse responses of the synthesis lattice.

The LiftLT is sufficiently fast for many applications, especially in hardware, since most of the incrementally added computation comes from the 2 butterflies and the 6 shift-and-add lifting steps. It is faster than the type-I fast LOT described in H. S. Malvar, *Signal Processing with Lapped Transforms*, Artech House, 1992. Besides its low complexity, the LiftLT possesses many characteristics of a high-performance transform in image compression: (i) it has high energy compaction due to a high coding gain and a low attenuation near DC where most of the image energy is concentrated; (ii) its synthesis basis functions also decay smoothly to zero, resulting in blocking-free reconstructed images.

Comparisons of complexity and performance between the LiftLT and other popular transforms are tabulated in Table 1 and Table 2. The LiftLT's performance is already very close to that of the optimal generalized lapped biorthogonal transform, while its complexity is the lowest amongst the transforms except for the DCT.

To assess the new method in image coding, we compared images coded and decoded with four different transforms:
DCT: 8-channel, 8-tap filters
Type-I Fast LOT: 8-channel, 16-tap filters
LiftLT: 8-channel, 16-tap filters
Wavelet: 9/7-tap biorthogonal.

In this comparison, we use the same SPIHT's quantizer and entropy coder, A. Said and W. A. Pearlman, "A new fast and efficient image coder based on set partitioning in hierarchical trees," *IEEE Trans on Circuits Syst. Video Tech.*, vol. 6, pp. 243–250, June 1996, for every transform. In the block-transform cases, we use the modified zero-tree structure in T. D. Tran and T. Q. Nguyen, "A lapped transform embedded image coder," *ISCAS*, Monterey, May 1998, where each block of transform coefficients is treated analogously to a full wavelet tree and three more levels of decomposition are employed to decorrelate the DC subband further.

Table 1 contains a comparison of the complexity of these four coding systems, comparing numbers of operations needed per 8 transform coefficients:

|  | Lena | | | | Goldhill | | | | Barbara | | | |
| --- | --- | --- | --- | --- | --- | --- | --- | --- | --- | --- | --- | --- |
| Comp. Ratio | 9/7 WL SPIHT | 8 × 8 DCT | 8 × 16 LOT | 8 × 16 LiftLT | 9/7 WL SPIHT | 8 × 8 DCT | 8 × 16 LOT | 8 × 16 LiftLT | 9/7 WL SPIHT | 8 × 8 DCT | 8 × 16 LOT | 8 × 16 LiftLT |
| 8 | 40.41 | 39.91 | 40.02 | 40.21 | 36.55 | 36.25 | 36.56 | 36.56 | 36.41 | 36.31 | 37.22 | 37.57 |
| 16 | 37.21 | 36.38 | 36.69 | 37.11 | 33.13 | 32.76 | 33.12 | 33.22 | 31.4 | 31.11 | 32.52 | 32.82 |
| 32 | 34.11 | 32.9 | 33.49 | 34 | 30.56 | 30.07 | 30.52 | 30.63 | 27.58 | 27.28 | 28.71 | 28.93 |
| 64 | 31.1 | 29.67 | 30.43 | 30.9 | 28.48 | 27.93 | 28.34 | 28.54 | 24.86 | 24.58 | 25.66 | 25.93 |
| 100 | 29.35 | 27.8 | 28.59 | 29.03 | 27.38 | 26.65 | 27.08 | 27.28 | 23.76 | 23.42 | 24.32 | 24.5 |
| 128 | 28.38 | 26.91 | 27.6 | 28.12 | 26.73 | 26.01 | 26.46 | 26.7 | 23.35 | 22.68 | 23.36 | 23.47 |

| Transform | No. Multiplications | No. Additions | No. Shifts |
| --- | --- | --- | --- |
| 8 × 8 DCT | 13 | 29 | 0 |
| 8 × 16 Type-I Fast LOT | 22 | 54 | 0 |
| 917 Wavelet, 1-level | 36 | 56 | 0 |
| 8 × 6 Fast LiftLT | 14 | 51 | 6 |

In such a comparison, the number of multiplication operations dominates the "cost" of the transform in terms of computing resources and time, and number of additions and number of shifts have negligible effect. In this table, it is clear that the fast LiftLT is almost as low as the DCT in complexity and more than twice as efficient as the wavelet transform.

Table 2 sets forth a number of different performance measures for each of the four methods:

| Transform | Coding Gain (dB) | DC Atten. (–dB) | Stopband Atten. (–dB) | Mir. Freq. Atten. (–dB) |
| --- | --- | --- | --- | --- |
| 8 × 8 DCT | 8.83 | 310.62 | 9.96 | 322.1 |
| 8 × 16 Type-I Fast LOT | 9.2 | 309.04 | 17.32 | 314.7 |
| 8 × 16 Optional LT | 9.62 | 327.4 | 13.5 | 55.54 |
| 8 × 16 Fast LiftLT | 9.54 | 312.56 | 13.21 | 304.85 |

The fast LiftLT is comparable to the optional 8×16 LT transform in coding gain and stopband attenuation an significantly better than the DCT.

Figure 9:
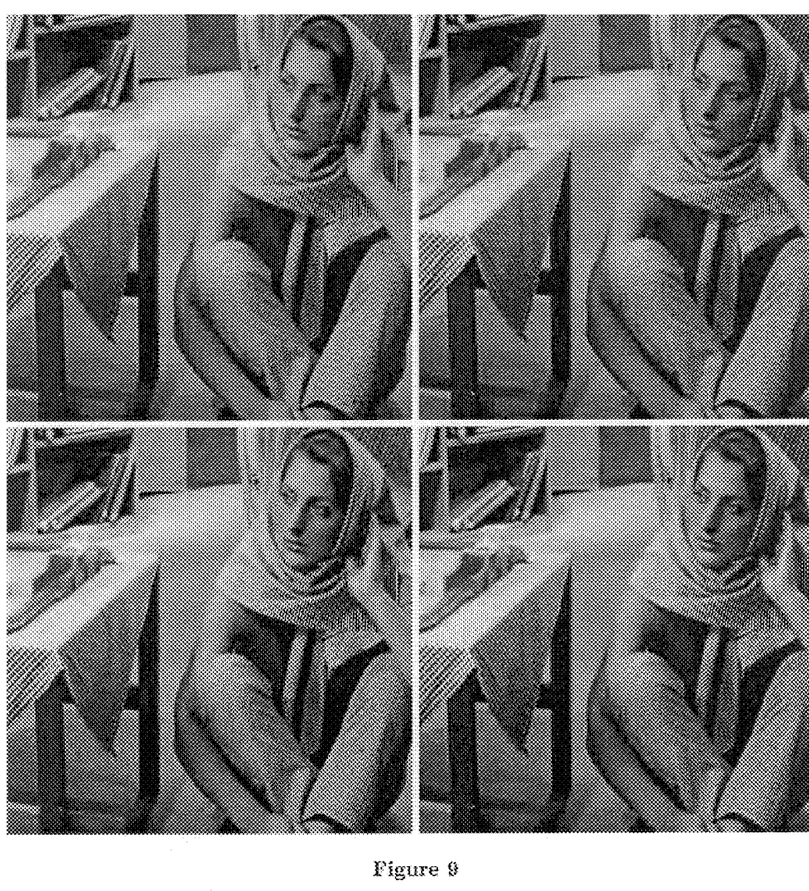
FIG. 9 portrays reconstructed "Barbara" images at 1:32 compression ratio.

Reconstructed images for a standard 512×512 "Barbara" test image at 1:32 compression ratio are shown in FIG. 9 for aesthetic and heuristic evaluation. Top left 21 is the reconstructed image for the 8×8 DCT (27.28 dB PSNR); top right shows the result for the 8×16 LOT(28.71 dB PSNR); bottom left is the 9/7 tap wavelet reconstruction (27.58 dB PSNR); and bottom right, 8×16 LiftLT (28.93 dB PSNR). The objective coding results for standard 512×512 "Lena," "Goldhill," and "Barbara" test image (PSNR in dB's) are tabulated in Table 3:

PSNR is an acronym for power signal to noise r-atio and represents the logarithm of the ratio of maximum amplitude squared to the mean square error of the reconstructed signal expressed in decibels (dB).

The LiftLT outperforms its block transform relatives for all test images at all bit rates. Comparing to the wavelet transform, the LiftLT is quite competitive on smooth images—about 0.2 dB below on Lena. However, for more complex images such as Goldhill or Barbara, the LiftLT consistently surpasses the 9/7-tap wavelet. The PSNR improvement can reach as high as 1.5 dB.

FIG. 9 also shows pictorially the reconstruction performance in Barbara images at 1:32 compression ratio for heuristic comparison. The visual quality of the LiftLT reconstructed image is noticeably superior. Blocking is completely avoided whereas ringing is reasonably contained. Top left: 8×8 DCT, 27.28 dB. Top right: 8×16 LOT, 28.71 dB. Bottom left: 9/7-tap wavelet, 27.58 dB. Bottom right: 8×16 LiftLT, 28.93 dB. Visual inspection indicates that the LiftLT coder gives at least as good performance as the wavelet coder. The appearance of blocking artifacts in the DCT reconstruction (upper left) is readily apparent. The LOT transform result (upper right) suffers visibly from the same artifacts even though it is lapped. In addition, it is substantially more complex and therefore slower than the DCT transform. The wavelet transform reconstruction (lower left) shows no blocking and is of generally high quality for this level of compression. It is faster than the LOT but significantly slower than the DCT. Finally, the results of the LiftLT transform are shown at lower right. Again, it shows no blocking artifacts, and the picture quality is in general comparable to that of the wavelet transform reconstruction, while its speed is very close to that of the bare DCT.

We claim:

1. An apparatus for coding, storing or transmitting, and decoding M×M sized blocks of digitally represented images, where M is an even number comprising
   a. a forward transform comprising
      i. a base transform having M channels numbered 0 through M−1, half of said channel numbers being odd and half being even;
      ii. an equal normalization factor in each of the M channels selected to be dyadic-rational;
      iii. a full-scale butterfly implemented as a series of lifting steps with a first set of dyadic rational coefficients;
      iv. M/2 delay lines in the odd numbered channels;

v. a full-scale butterfly implemented as a series of lifting steps with said first set of dyadic rational coefficients; and vi. a series of lifting steps in the odd numbered channels with a second specifically selected set of dyadic-rational coefficients;

b. means for transmission or storage of the transform output coefficients; and c. an inverse transform comprising
i. M channels numbered 0 through M−1, half of said channel numbers being odd and half being even;
ii. a series of inverse lifting steps in the odd numbered channels with said second set of specifically selected dyadic-rational coefficients;
iii. a full-scale butterfly implemented as a series of lifting steps with said first set of specifically selected dyadic-rational coefficients;
iv. M/2 delay lines in the even numbered channels;
v. a full-scale butterfly implemented as a series of lifting steps with said first set of specifically selected dyadic-rational coefficients;
vi. an equal denormalization factor in each of the M channels specifically selected to be dyadic-rational; and
vii. a base inverse transform having M channels numbered 0 through M−1.

2. The apparatus of claim 1 in which the normalizing factor takes the value 25/16 and simultaneously the denormalizing factor takes the value 16/25.

3. The apparatus of claim 1 in which the normalizing factor takes the value 5/4 and simultaneously the denormalizing factor takes the value 4/5.

4. The apparatus of claim 1 in which the first set of dyadic rational coefficients are all equal to 1.

5. The apparatus of claim 1 in which the second set of dyadic rational coefficients are all equal to ½.

6. The apparatus of claim 1 in which the base transform is any M×M invertible matrix of the form of a linear phase filter and the inverse base transform is the inverse of said M×M invertible matrix.

7. The apparatus of claim 1 in which the base transform is the forward M×M discrete cosine transform and the inverse base transform is the inverse M×M discrete cosine transform.

8. An apparatus for coding, compressing, storing or transmitting, and decoding a block of M×M intensities from a digital image selected by an M×M window moving recursively over the image, comprising:

a. an M×M block transform comprising:
i. an initial stage
ii. a normalizing factor in each channel b. a cascade comprising a plurality of dyadic rational lifting transforms, each of said plurality of dyadic rational lifting transforms comprising
i. a first bank of pairs of butterfly lifting steps with unitary coefficients between adjacent lines of said transform;
ii. a bank of delay lines in a first group of M/2 alternating lines;
iii. a second bank of butterfly lifting steps with unitary coefficients, and
iv. a bank of pairs of butterfly lifting steps with coefficients of 1/2 between M/2−1 pairs of said M/2 alternating lines;

c. means for transmission or storage of the output coefficients of said M×M block transform; and d. an inverse transform comprising
i. a cascade comprising a plurality of dyadic rational lifting transforms, each of said plurality of dyadic rational lifting transforms comprising
a) a bank of pairs of butterfly lifting steps with coefficients of 1/2 between said M/2−1 pairs of said M/2 alternating lines;
b) a first bank of pairs of butterfly lifting steps with unitary coefficients between adjacent lines of said transform;
c) a bank of delay lines in a second group of M/2 alternating lines, and
d) a second bank of pairs of butterfly lifting steps with unitary coefficients between adjacent lines of said transform;
ii. a de-scaling bank, and
iii. an inverse initial stage.

9. A method of coding, storing or transmitting, and decoding M×M sized blocks of digitally represented images, where M is an even number, comprising a. transmitting the original picture signals to a coder, which effects the steps of
i. converting the signals with a base transform having M channels numbered 0 through M−1, half of said channel numbers being odd and half being even,
ii. normalizing the output of the preceding step with a dyadic rational normalization factor in each of said M channels;
iii. processing the output of the preceding step through two lifting steps with a first set of identical dyadic rational coefficients connecting each pair of adjacent numbered channels in a butterfly configuration;
iv. transmitting the resulting coefficients through M/2 delay lines in the odd numbered channels;
v. processing the output of the preceding step through two inverse lifting steps with the first set of dyadic rational coefficients connecting each pair of adjacent numbered channels in a butterfly configuration; and
vi. applying two lifting steps with a second set of identical dyadic rational coefficients connecting each pair of adjacent odd numbered channels to the output of the preceding step;

b. transmitting or storing the transform output coefficients;

c. receiving the transform output coefficients in a decoder; and d. processing the output coefficients in a decoder, comprising the steps of
i. receiving the coefficients in M channels numbered 0 through M−1, half of said channel numbers being odd and half being even;
ii. applying two inverse lifting steps with dyadic rational coefficients connecting each pair of adjacent odd numbered channels;
iii. applying two lifting steps with dyadic rational coefficients connecting each pair of adjacent numbered channels in a butterfly configuration;
iv. transmitting the result of the preceding step through M/2 delay lines in the even numbered channels;
v. applying two inverse lifting steps with dyadic rational coefficients connecting each pair of adjacent numbered channels in a butterfly configuration;
vi. denormalizing the result of the preceding step with a dyadic rational inverse normalization factor in each of said M channels; and
vii. processing the result of the preceding step through a base inverse transform having M channels numbered 0 through M−1.

10. A method of coding, compressing, storing or transmitting, and decoding a block of M×M intensities from a digital image selected by an M×M window moving recursively over the image, comprising the steps of:
- a. Processing the intensities in an M×M block coder comprising the steps of:
    - i. processing the intensities through an initial stage;
    - ii. scaling the result of the preceding step in each channel;
- b. processing the result of the preceding step through a cascade comprising a plurality of dyadic rational lifting transforms, each of said plurality of dyadic rational lifting transforms comprising
    - i. a first bank of pairs of butterfly lifting steps with unitary coefficients between adjacent lines of said transform;
    - ii. a bank of delay lines in a first group of M/2 alternating lines;
    - iii. a second bank of butterfly lifting steps with unitary coefficients, and
    - iv. a bank of pairs of butterfly lifting steps with coefficients of 1/2 between M/2-1 pairs of said M/2 alternating lines;
- c. transmitting or storing the output coefficients of said M×M block coder;
- d. receiving the output coefficients in a decoder; and
- e. processing the output coefficients in the decoder, comprising the steps of
    - i. processing the output coefficients through a cascade comprising a plurality of dyadic rational lifting transforms, each of said plurality of dyadic rational lifting transforms comprising
        - a) a bank of pairs of butterfly lifting steps with coefficients of 1/2 between said M/2-1 pairs of said M/2 alternating lines;
        - b) a first bank of pairs of butterfly lifting steps with unitary coefficients between adjacent lines of said transform;
        - c) a bank of delay lines in a second group of M/2 alternating lines;
        - d) a second bank of pairs of butterfly lifting steps with unitary coefficients between adjacent lines of said transform;
        - e) a de-scaling bank; and
- f. processing the results of the preceding step in an inverse initial stage.

11. The apparatus of claim 1 in which the constants are approximations chosen for rapid computing rather than exact constants.

* * * * *